UNITED STATES PATENT OFFICE.

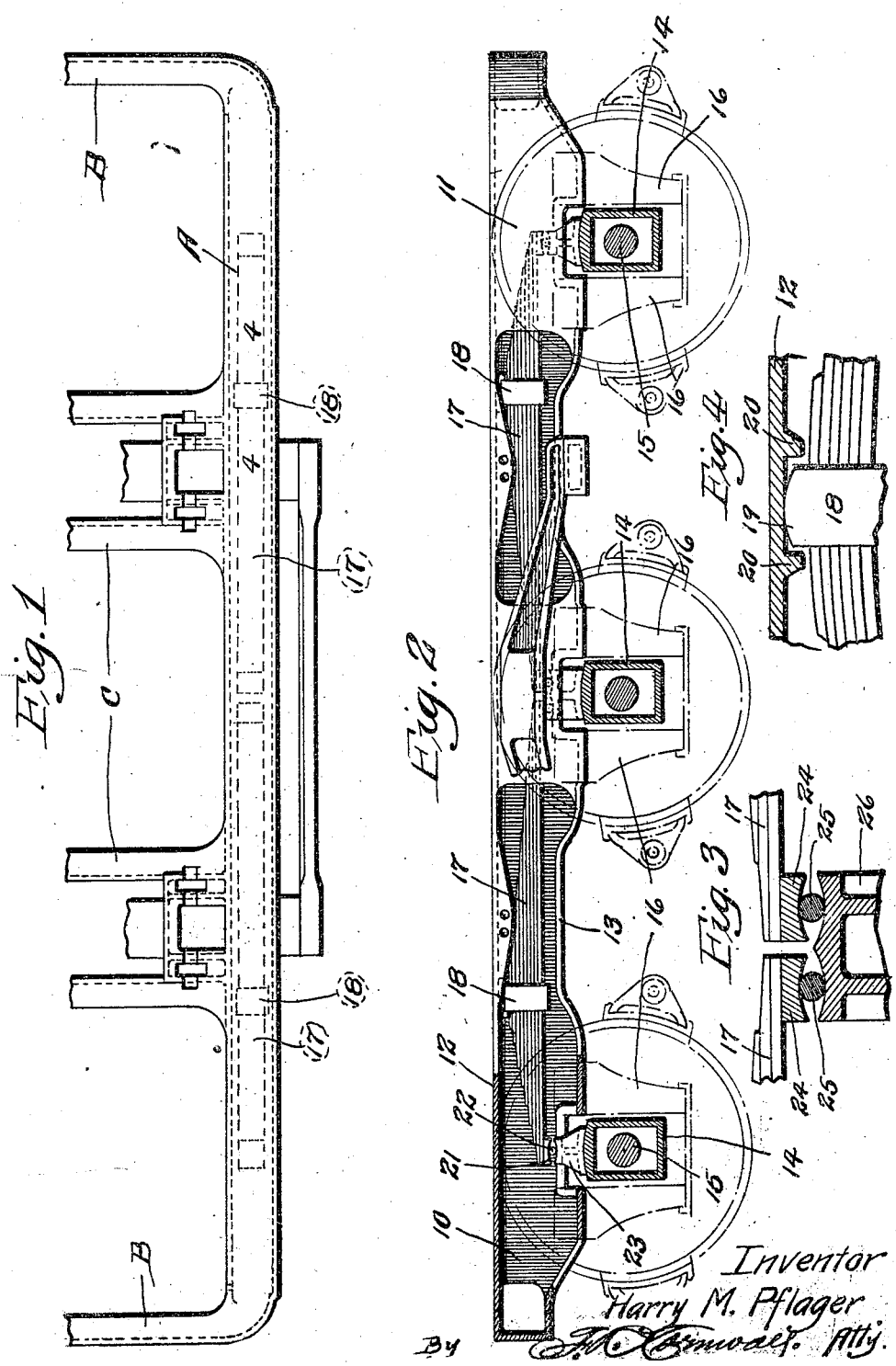

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

CAR-TRUCK.

1,278,008.

Specification of Letters Patent. Patented Sept. 3, 1918.

Application filed July 6, 1917. Serial No. 179,037.

*To all whom it may concern:*

Be it known that I, HARRY M. PFLAGER, a citizen of the United States, residing at St. Louis, Missouri, have invented a certain new and useful Improvement in Car-Trucks, of which the following is a full, clear, and exact description, such as will enable others skilled in the art to which it appertains to make and use the same, reference being had to the accompanying drawings, forming part of this specification.

My invention relates generally to railway car truck construction and more particularly to new and improved means for yieldingly supporting the truck frame upon the journal boxes, my present invention being an improvement on a similar construction disclosed in Patent No. 1,118,903, issued to the assignee of Clarence H. Howard and myself November 24, 1914.

The principal objects of my invention are, to provide increased flexibility of the truck and equalize the distribution of weight upon all of the truck wheels; to provide a comparatively simple truck frame support which, by virtue of its arrangement and construction, will be effective in distributing and absorbing shocks and vibration due to track irregularities and preventing said shocks and vibration from being transmitted to the car body, thereby making the riding movement of said body more easy and gentle; and to dispose the flexible supporting means so that it will in nowise interfere with the free inspection, repair and adjustment of the brakes and brake rigging associated with the truck and the wheels thereof.

With the foregoing and other objects in view, my invention consists in a plurality of leaf springs, preferably located within the wheel pieces of the truck frame and disposed so that their ends bear on the journal boxes associated with the truck and the truck frame bearing directly upon said springs at points intermediate their ends.

My invention further consists in certain novel features of construction and arrangement of parts, hereinafter more fully described and claimed and illustrated in the accompanying drawings, in which—

Figure 1 is a top plan view of the side portion of a six wheel truck frame with which my improved supporting means is associated;

Fig. 2 is a side elevational view of the truck frame and showing my improved supporting means in position for use thereupon;

Fig. 3 is a detail sectional view of the bearings between the inner ends of the supporting springs and the central one of the journal boxes;

Fig. 4 is an enlarged detail section taken approximately on the line 4—4 of Fig. 1.

The truck frame shown in the accompanying drawings is of an accepted six wheel type, said frame being preferably cast integral and comprising substantially hollow side rails or wheel pieces A, end rails B, and transom members C.

The hollow wheel piece A is substantially box-shape in cross section and comprises an inner wall 10, an outer wall 11, top plate 12 and bottom plate 13. The bottom plate is cut away at suitable points for the accommodation of the journal boxes 14, the latter containing the usual bearings for the wheel carrying axles 15 and said journal boxes being positioned between the usual pedestal jaws 16, the same being fixed to and depending from the wheel piece A. The outer wall 11 of the wheel piece is cut away at suitable points to permit the ready insertion or removal of the truck frame supporting members. These supporting members as shown are in the form of straight leaf springs 17, there being a pair of said springs disposed within each hollow wheel piece of the truck frame.

The individual members or leaves of each spring are graduated in length from top to bottom, that is, the shortest leaf is at the top and the intermediate leaves gradually increase in length toward the longest leaf or leaves at the bottom and said leaves are disposed so that the thickest portion of the spring is at a point to one side of the longitudinal center thereof.

A retaining sleeve or band 18 passes around the thickest portion of each spring and holds the leaves in proper assembled relation. The top of each band 18 is preferably curved lengthwise as illustrated in Fig.

4 and this curved surface bears directly against a flat bearing surface 19 formed between lugs 20, the same depending from the underside of top plate 12.

The outer end of each spring 17 is provided on its underside with a bearing block 21, the same being concave on its underside and said bearing block resting directly upon a roller 22, the latter being positioned upon a concave bearing surface formed in the top of a block 23. This bearing block rests directly upon the corresponding one of the end journal boxes.

The inner ends of each pair of springs 17 overlie the middle one of the journal boxes and carried by said inner ends are blocks 24 provided on their undersides with concave bearing surfaces which rest directly upon rollers 25. These rollers are positioned upon concave bearing surfaces formed in the top of a block 26, the latter being positioned on the central one of the journal boxes. Thus, both ends of each spring rest upon roller bearings, the latter being located on bearing blocks carried by the journal boxes.

The distance from the bands 18 to the outer ends of the springs or the ends which rest upon the end journal boxes is approximately half the distance from said bands to the inner ends of the springs or the ends which rest upon the central journal box, such arrangement being necessary to equalize the weight of the truck frame and parts carried thereby upon the journal boxes.

In my improved construction it will be understood that the springs 17 not only perform their usual and expected functions but also perform the functions of equalizing members, for they are instrumental in equalizing the carried weight upon the journal boxes and they also equalize and distribute service shocks and vibration resulting from the passage of the wheels of the truck over rough portions of the track, crossings, switches and the like.

In the event that any one pair of wheels are elevated or lowered to an appreciable degree relative to the other wheels, the corresponding springs acting as equalizing members will rock upon their fulcrums, namely, the points of bearing between the bands 18 and the bearing faces 19, and as this movement takes place, the fulcrum points will be slightly shifted relative to the ends of the springs so that the distance between the fulcrums and the raised or lowered ends of the springs is materially shortened, likewise increasing the distance between the fulcrums and the opposite ends of the springs. This action necessarily gives the lowered end of the spring the advantage in power and the change of position of the fulcrum point is gradual and in proportion to the movement of the spring. Necessarily, as the ends of the springs are raised or lowered, the bearing blocks on the ends thereof will ride freely without friction upon the corresponding roller bearings, which latter are carried by the bearing blocks on the journal boxes.

My improved construction does away with all rigid or non-elastic equalizing members, affords an efficient yielding and flexible support for the truck frame, thereby making the riding movement of the supported car body more easy and gentle, and all service shocks and vibrations which may be imparted to the wheels are absorbed or equalized and consequently prevented from being transmitted to the car body. By virtue of the fact that the supporting members are located within the wheel pieces of the truck frame and said wheel pieces are located in a plane above the brake beams and shoes, the latter, together with practically all of the brake rigging, are free and open to inspection and likewise readily accessible in the event of repairs and adjustments.

It will be readily understood that minor changes in the size, form and construction of the various parts of my improved car truck can be made and substituted for those herein shown and described, without departing from the spirit of my invention, the scope of which is set forth in the appended claims.

I claim:

1. The combination with a truck frame and its journal boxes, of resilient equalizing members having rolling supports on the journal boxes and serving as a yielding support for the truck frame.

2. The combination with a truck frame and its journal boxes, of resilient equalizing members having rolling supports on the journal boxes and serving as a yielding support for the truck frame, which springs are located substantially within the wheel pieces of the truck frame.

3. The combination with a truck frame and its journal boxes, of leaf springs interposed between said journal boxes and truck frame, and roller bearings between the journal boxes and said springs.

4. The herein described flexible support for railway car truck frames, comprising leaf springs, the ends of which have rolling supports on the journal boxes of the truck frame, and said truck frame resting directly upon said springs.

5. The combination with a car truck frame and its journal boxes, of leaf springs interposed between the truck frame and the journal boxes and having rolling supports upon the latter, which leaf springs yieldingly support the truck frame and also serve as equalizers to distribute the weight of the truck frame and parts carried thereby upon the journal boxes.

6. In a car truck, a flexible equalizing member serving as a support for the car truck and having rolling supports upon the journal boxes associated with said truck.

7. In a car truck, a flexible equalizing member serving as a support for the car truck and having rolling supports upon the journal boxes associated with said truck, said flexible equalizer having a rocker bearing upon the truck frame.

8. In a car truck, a flexible equalizing member serving as a support for the car truck and supported by the journal boxes associated with said truck, and rolling bearings between said flexible equalizing member and said journal boxes.

9. The combination with a car truck and its journal boxes, the wheel pieces of which truck are substantially hollow, of a pair of flexible equalizing members disposed within each wheel piece with their outer ends resting upon rolling supports on the outer pair of journal boxes and their inner ends upon rolling supports on the central journal box, and said equalizing members serving as a yielding support for the truck frame.

10. The combination with a truck frame, of a flexible equalizing member having a shiftable fulcrum on said frame, and the ends of said member being supported by the journal boxes associated with said frame.

11. The combination with a truck frame, of a flexible equalizing member having a shiftable fulcrum on said frame, the ends of said member being supported by the journal boxes associated with said frame, and roller bearings between the ends of said member and the journal boxes associated with the truck frame.

In testimony whereof I hereunto affix my signature this 26th day of June, 1917.

HARRY M. PFLAGER.